3,829,506
BIODEGRADABLE SURFACE ACTIVE AGENTS HAVING GOOD FOAM PROPERTIES AND FOAM STABILIZING CHARACTERISTICS

Irving R. Schmolka, Grosse Ile, and Reinhold K. Seizinger, Trenton, Mich., assignors to BASF Wyandotte, Wyandotte, Mich.
No Drawing. Continuation-in-part of application Ser. No. 148,976, June 1, 1971, which is a continuation-in-part of application Ser. No. 845,516, July 28, 1969, both now abandoned. This application Nov. 7, 1972, Ser. No. 304,526

Int. Cl. C07c 43/04

U.S. Cl. 260—615 B                                    6 Claims

ABSTRACT OF THE DISCLOSURE

Heteric polyether polyols are prepared by the copolymerization of low molecular weight alkylene oxides and α-olefin oxides containing from ten to twenty carbon atoms with low molecular weight active hydrogen-containing compounds.

The present application is a continuation-in-part of copending U.S. Patent Application Ser. No. 148,976 filed June 1, 1971 now abandoned, which is in turn a continuation-in-part of U.S. Patent Application Ser. No. 845,516 filed July 28, 1969, now abandoned.

This invention relates to heteric polyether polyols and methods for their preparation. It is more particularly concerned with heteric polyether polyols which are biodegradable surface active agents having good foam properties and foam stabilizing characteristics.

Polyether polyols obtained from the reaction of alkylene oxides with active hydrogen-containing compounds are well known. These polyether polyols have found wide use throughout industry and in the home in applications where it is desirable to reduce the surface tension of a liquid so that it will become more miscible with other liquids or will easily wet the surfaces of solid materials. These compounds may be found in the form of solids or liquids; they may be both foamers and defoamers; they may range from hydrophobic to hydrophilic; and they may vary considerably in their resistance to degradation of bacterial attack. With respect to the present invention, three properties are of particular importance, namely, (1) the product must have a high degree of biodegradability, (2) the product must have good foam properties, and (3) the product must have good foam stabilizing characteristics.

It is an object of this invention to provide a novel, nonionic surface active agent. It is another object of this invention to provide a nonionic composition which is biodegradable, has good foam stability and foam stabilizing characteristics. It is still another object of this invention to provide a process for preparing hydrophilic polyether polyols. Still other objects will appear from the more detailed description of this invention which follows.

According to this invention, polyether polyols having a molecular weight of from 400 to 6000, preferably from 1000 to 4000, are prepared by reacting a mixture of ethylene oxide and an α-olefin oxide with a low molecular weight active hydrogen-containing compound. It is to be understood that the ethylene oxide can be used in admixture with other low molecular weight alkylene oxides and that a mixture of α-olefin oxides can be employed. The amount of low molecular weight alkylene oxide used in the reaction will vary so that the resulting product will have varying degrees of hydrophilicity, depending upon the desired application of the polyether polyol. In any case, this requires an ethylene oxide addition in an amount such that the resulting polyol contains from about 40 to 80% by weight ethylene oxide, and preferably from about 40 to 60% ethylene oxide. The amount of α-olefin oxide required will be an amount sufficient to react with at least one active hydrogen of the active hydrogen-containing compound. The copolymerization is carried out in the presence of a basic catalyst at an elevated inert gas pressure in a suitably heated reactor. The reaction may be carried out in the presence or in the absence of an inert organic solvent.

It has been found that in the preparation of the polyether polyols of the present invention, it is necessary to copolymerize the ethylene oxide and α-olefin oxide with the active hydrogen-containing compounds. Thus, when the α-olefin oxide is mixed with the active hydrogen compound at reaction conditions, the two components separate and very little, if any, reaction occurs. However, as soon as the low molecular weight alkylene oxide is added, the reaction immediately proceeds. The reason for this is not known, but it is believed that the alkylene oxide acts as a solubilizing agent, dissolving the α-olefin oxide and active hydrogen-containing compound, thus increasing the reactive sites of the reactants.

The above-described polyether polyols, when formulated with other compounds, have many applications. Since the polyols have excellent foam stability and biodegradable properties, the polyols are useful in many types of detergents. These include light-duty detergents, such as hand dishwashing and fine fabric washing, heavy-duty detergents, all-purpose liquid cleaners, rinse aids, sanitizers, bubble baths, shampoos, and metal cleaners, just to name a few. The polyether polyols of this invention can also be used as saturants for film faced dressings of the type having relatively low adherence to healing wounds, as carriers for a spermicidal vaginal pharmaceutical concentrate for producing foam with aerosol propellants, and as agents to increase foam height and foam stability of other nonionic surfactants. It has also been found that these polyols undergo the typical reactions of alcohols. Formation of inorganic and organic esters are possible by reaction of the polyols with sulfuric acid, phosphoric acid, and mono- or polycarboxylic acids. Other ethers may be prepared by reaction of these polyols with benzyl chloride, alkyl chloride, and the like. The terminal hydroxyl groups may be replaced by chlorine if reacted with thionyl chloride. Urethanes may also be prepared by reacting these polyols with isocyanate-containing compounds.

The low molecular weight active hydrogen-containing compounds that may be used in the practice of this invention are the polyhydric alcohols having from about two to ten carbon atoms and from about two to six hydroxyl groups. These include, for example, alkane polyols, such as ethylene glycol, propylene glycol, 1,4-butane diol, 1,2-butane diol, trimethylolpropane, glycerol, 2,3,5,6-hexane tetrol, sorbitol, pentaerythritol, glucose and the like; alkene polyols, such as 2-butene-1,4-diol, 2-hexene-1,4,6-triol, 3-heptene-1,2,6,7-tetrol, 1,5-hexadiene-3,4-diol, and and the like; the alkylene polyols, such as 2-butyne-1,4-diol, 2-hexyne-1,4,6-triol, 4-octyne-1,2,7,8-tetrol, and the like; and oxyalkylene polyols, such as diethylene glycol, triethylene glycol, tetraethylene glycol, dipropylene glycol, tripropylene glycol, and the like.

The $\alpha$-olefin oxides which may be used in this invention are those oxides containing from about ten to twenty carbon atoms. The amount of $\alpha$-olefin oxide required to react with a polyhydric alcohol will be at least one mole of $\alpha$-olefin oxide per mole of polyhydric alcohol. The ratio of from about 1.0 mole to about 1.5 moles of $\alpha$-olefin oxide per mole of polyhydric alcohol when the alcohol is a triol is the preferred ratio and for tetrafunctional and higher polyfunctional alcohols, a mole ratio of 2 to 3 moles of $\alpha$-olefin oxide per mole of polyhydric alcohol is preferred. Examples of the $\alpha$-olefin oxides which may be used in the practice of this invention include, decylene oxide, undecylene oxide, dodecylene oxide, tridecylene oxide, tetradecylene oxide, pentadecylene oxide, hexadecylene oxide, heptadecylene oxide, octadecylene oxide, nonadecylene oxide, eicosylene oxide and mixtures thereof. Mixtures of $\alpha$-olefin oxides are commercially available under the trademark Nedox 1114 and Nedox 1518. Nedox 1114 is a mixture of $\alpha$-olefin oxides having an average molecular weight of 189 containing approximately 25% by weight of a $C_{11}$ olefin oxide, 25% by weight of a $C_{12}$ olefin oxide, 25% by weight of a $C_{13}$ olefin oxide and 25% by weight of a $C_{14}$ olefin oxide. Nedox 1518 is a mixture of $\alpha$-olefin oxides having an average molecular weight of 245 containing approximately 29% by weight of a $C_{15}$ olefin oxide, 29% by weight of a $C_{16}$ olefin oxide and 29% by weight of a $C_{17}$ olefin oxide and 13% by weight of a $C_{18}$ olefin oxide.

The low molecular weight alkylene oxides that may be used in the practice of this invention are alkylene oxides containing from two to four carbon atoms. These include ethylene oxide, 1,2-propylene oxide, 1,2-butylene oxide, 1,3-butylene oxide, 1,4-butylene oxide and 2,3-butylene oxide. Ethylene oxide or a mixture of ethylene oxide with one or more other alkylene oxides is preferred. If a mixture of ethylene oxide and another lower alkylene oxide is employed in the invention, the mixture should contain at least fifty weight percent ethylene oxide. The amount of low molecular weight alkylene oxide required in the practice of this invention is an amount sufficient to impart the desired foaming and foam stabilizing characteristics of the polyol. Amounts greater than this unbalance the desired hydrophilic-hydrophobic characteristics of the resulting polyol. It has been found that at least three moles of ethylene oxide per mole of polyhydric alcohol are required to produce a polyol with hydrophilic characteristics.

Any suitable prior art alkaline oxyalkylation catalyst can be used in the practice of this invention. These include, for example, strong bases, such as sodium hydroxide, sodium methylate, potassium hydroxide, and the like; salts of strong bases with weak acids, such as sodium acetate, sodium glycolate, and the like and quaternary ammonium compounds, such as benzyl dimethyl cetyl ammonium hydroxide, and the like. The concentration of these catalysts in the reaction mixture is not critical and may vary from about 0.1% to 5% by weight of the polyhydric alcohol reactant.

An inert organic solvent may be utilized in the above-described procedures. The amount of solvent used is that which is sufficient to provide a suitable reaction medium and is generally on a molar basis in excess of the total amount of the reactants. Examples of suitable solvents include aliphatic hydrocarbons, such as hexane, heptane, isoheptane; aromatic hydrocarbons, such as benzene, toluene, xylene; chlorinated hydrocarbons, such as carbon tetrachloride, ethylene dichloride, propylene dichloride; and oxygenated hydrocarbons, such as diethyl ether, dimethyl ether, anisole, and the like.

In accordance with this invention, a polyether polyol is prepared by mixing a low molecular weight polyhydric alcohol containing from two to ten carbon atoms and from two to six hydroxyl groups with from about 1.0 mole to 3.0 moles per mole of alcohol of an $\alpha$-olefin oxide having from ten to twenty carbon atoms; heating said mixture to a temperature in the range of about 50° C. to 150° C., preferably from 80° C. to 130° C. under an inert gas pressure preferably from about 34 p.s.i.g. to 90 p.s.i.g.; adding ethylene oxide or a mixture of ethylene oxide and other alkylene oxides having from three to four carbon atoms to said mixture in an amount so that the resulting polyether polyol product will contain from 40% to 80% by weight ethylene oxide; and maintaining said mixture at a temperature and pressure in said range for a period of about one hour to ten hours, preferably one to three hours. If desired a catalyst may be added to the reaction mixture prior to the ethylene oxide addition. Alkaline catalysts such as potassium hydroxide or acid catalysts such as boron trifluoride are useful as is well established in the art. Generally, the amount of ethylene oxide utilized, whether singly or in admixture with other low molecular weight alkylene oxides, will be from about 3 to 30 moles per mole of polyhydric alcohol.

The following examples will illustrate the practice of this invention, but are not to be considered as being unduly limitative thereof. The OH number in the examples was deterbined by ASTM–D–1638–61T and the surface tension measurements were determined with a Du Nuoyes Tensiometer. The wetting time was determined by the Draves cotton skin test AATCC test method 17–1952 evaluation of wetting agents, using a 3-gram hook.

To evaluate the foam characteristics of a composition of the present invention, a solution was prepared by dissolving a given amount of said composition or mixtures of said composition in tap water and placing 10 liters of said solution in a Pyrex jar measuring 10″ in diameter and 10″ in height. This Pyrex jar was equipped with a propeller-type stirrer, knife blade heaters, a thermoregulator and a thermometer. A small centrifugal pump was arranged to circulate the solution contained in this jar through a calibrated glass flow meter to a jet orifice prepared from the base of a No. 20 Becton-Dickerson & Company hypodermic needle by enlarging the hole in the base with a No. 56 twist drill. The jet orifice was mounted coaxially inside a Pyrex glass tube (51 mm. by 910 mm.) which was placed vertically in the solution. The jet was positioned so that it was 700 mm. above the surface of the solution in the jar, and the Pyrex tube was arranged to project 210 mm. below the surface of the solution.

The solution was brought to 120° F. by means of the knife blade heater and maintained at a constant temperature by means of the thermoregulator. The centrifugal pump was started and the flow rate of solution was metered through the jet. The flow was adjusted to 400 ml./min. by by-passing part of the stream back into the Pyrex jar before passage through the flow-meter. The solution passing through the jet was directed against the wall of the vertical tube while the flow was adjusted and the temperature was equilibrated to prevent foaming prior to the actual determination. The jet was then arranged to pass the solution coaxially downward through the center of the tube to impinge upon the surface of the solution located in the Pyrex tube. Timing was initiated from the instant the solution impinged on the liquid surface and continued until the foam reached 600 mm. or until the foaming time of ten minutes had transpired. At this point, timing was re-initiated to determine the relative foam stability after five minutes. The foam height readings were obtained from a calibration on the outside of the Pyrex tube with a zero mark being at the surface of the solution.

By the term "heteric" as used in this specification is meant that the polyols possess random distribution of oxyalkylene groups.

EXAMPLES I–IV

The following examples illustrate the preparation of polyether polyols of the present invention by copolymerization of a α-olefin oxide and ethylene oxide with glycerol.

Into a one-gallon autoclave, 184 grams of glycerol, 430 grams of a mixture of $C_{11}$ to $C_{14}$ α-olefin oxides having a molecular weight of 189, and 3 grams of sodium hydroxide were charged. A reduced pressure of 10 mm. of mercury was then applied while heating the mixture to 80° C. The temperature was maintained at 80° C. for five minutes, after which the autoclave was pressurized under nitrogen to 34 p.s.i.g. The temperature was then increased to about 130° C. and varying amounts of ethylene oxide were added. The addition of ethylene oxide to the mixture was done at 130° C. for a period of two hours. The mixture was held for another 45 minutes at this temperature. The mixture was then cooled to 50° C. and discharged.

Tables 1 and 2, below, illustrate the molar ratios of ethylene oxide to glycerol and the physical properties of the resulting polyol of each example. The mixture of α-olefin oxides employed in the following examples comprised approximately equal weight proportions of $C_{11}$-, $C_{12}$-, $C_{13}$- and $C_{14}$-olefin oxides.

TABLE 1

| | Moles of— | | | | Foam properties | | | |
|---|---|---|---|---|---|---|---|---|
| | | | | | Ascent time | | Descent reading, mm. at— | |
| Example | Glycerol | α-Olefin oxide | Ethylene oxide | OH No. | Minutes | Seconds | Start | Finish (5 min.) |
| I | 2 | 2 | 15.0 | 285 | 2 | 45 | 590 | 550 |
| II | 2 | 2 | 18.5 | 252 | 2 | 45 | 595 | 480 |
| III | 2 | 2 | 22.8 | 225 | 2 | 27 | 595 | 530 |
| IV | 2 | 2 | 10.0 | 320 | 2 | 30 | 590 | 540 |

TABLE 2

| Example | Cloud point, °C. 1% by weight polyether polyol in water. | Properties of 0.1% by weight polyether polyol in water | |
|---|---|---|---|
| | | Surface tension, dynes/cm. | Wetting time, seconds |
| I | 58 | 29.5 | 49.5 |
| II | 74 | 30.5 | 48 |
| III | 84 | 31.5 | 65 |
| IV | 34 | 30.3 | 74 |

Biodegradability was determined for Examples II and III according to the procedure outlined in the article "Foam Generation Method for Evaluating Biodegradability" by L. R. Bacon in *The Journal of the American Oil Chemists Society*, January 1966, pages 18–25. These Examples were found to have better than 95% biodegradation within five days.

EXAMPLE V

The following example illustrates the preparation of a polyether polyol of the present invention by copolymerization of an α-olefin oxide and ethylene oxide with glycerol.

Into a one-gallon autoclave, 184 grams of glycerol, 531 grams of a mixture of $C_{15}$ to $C_{18}$ α-olefin oxides having a molecular weight of 245, said mixture described in the specification and identified as Nedox 1518, and 3 grams of sodium hydroxide were charged. A reduced pressure of 10 mm. of mercury was then applied while heating the mixture to 80° C. The mixture was maintained at 80° C. for five minutes, then the autoclave was pressurized under nitrogen to 34 p.s.i.g. The temperature was then increased to about 130° C. and 58.6 grams of ethylene oxide was added over a period of two hours at 130° C. The mixture was held for another 45 minutes at this temperature. The mixture was then cooled to 50° C. and discharged.

The resulting polyether polyol was found to have an OH number of 266, a cloud point of 55° C. at a concentration of 1% by weight polyol in water, and a surface tension of 30.1 dynes per centimeter at a concentration of 0.1% by weight polyol in water. Foaming tests illustrated that the polyol foamed to 600 millimeters in five minutes and decayed to 450 millimeters in five minutes.

EXAMPLES VI–VIII

The following examples illustrate the foam stabilizing and foam enhancing properties of polyether polyols of the present invention when combined with other nonionic surface active agents. Three tests, identifiable as Tests 1, 2 and 3, were made for each example in order to illustrate these foaming properties. Test 1 was made with a solution containing 0.1% by weight of a nonionic. Test 2 was made with a solution containing 0.002% by weight of a polyether polyol of the present invention. Test 3 was made with a solution containing 0.1% by weight of a nonionic and 0.002% by weight of a polyether polyol of the present invention.

To evaluate the foam characteristics of these examples, the prescribed amount of nonionic, polyether polyol or mixture of the nonionic and polyether polyol was prepared in tap water and run according to the procedure described previously.

The following polyether polyol nonionics were used for these tests. Nonionics defined as Polyether Polyol A and B were compositions of the present invention whereas Nonionics C and D were compositions previously known in the art. Table 3, below, illustrates the results.

Polyether Polyol A

This was a nonionic surfactant of the present invention prepared from the reaction of one mole of glycerol, one mole of a mixture of α-olefin oxides having from fifteen to eighteen carbon atoms, and 6.65 moles of ethylene oxide, more fully described hereinbefore and identified as Nedox 1518.

Polyether Polyol B

This was a nonionic surfactant of the present invention prepared from the reaction of one mole of glycerol, one mole of a mixture of α-olefin oxides having from fifteen to eighteen carbon atoms, and 4.4 moles of ethylene oxide, more fully described hereinbefore and identified as Nedox 1518.

Nonionic C

This was a nonionic surfactant prepared by the sequential condensation of propylene and ethylene oxides with propylene glycol. It had two terminal hydroxyl groups, a molecular weight of about 2,000 and an oxyethylene content of about 40% by weight.

Nonionic D

This was a nonionic amine-based tetrol surfactant prepared by the sequential addition of propylene and ethylene oxides to ethylene diamine. It had a molecular weight of about 1,250 and an oxyethylene content of about 40% by weight.

TABLE 3

| Example | Test | Surfactants | Ascent Time Minutes | Ascent Time Seconds | Mm. | Descent Time Minutes | Mm. |
|---|---|---|---|---|---|---|---|
| VI | 1 | Nonionic "C" | 10 | | 150 | 5 | 30 |
| | 2 | Polyether polyol "B" | 10 | | 35 | 5 | 25 |
| | 3 | "C" Plus "B" | 4 | 57 | 600 | 5 | 560 |
| VIII | 1 | Nonionic "C" | 10 | | 150 | 5 | 30 |
| | 2 | Polyether polyol "A" | 10 | | 32 | 5 | 25 |
| | 3 | "C" plus "A" | 3 | 47 | 600 | 5 | 550 |
| VIII | 1 | Nonionic "D" | 10 | | 510 | 5 | 0 |
| | 2 | Polyether polyol "A" | 10 | | 32 | 5 | 25 |
| | 3 | "D" plus "A" | 2 | 27 | 600 | 5 | 500 |

As can be seen from Table 3, the addition of a polyether polyol of the present invention to other nonionic surface active agents enhances the foam height and increases the foam stability of said nonionics.

EXAMPLE IX

The following example illustrates the preparation of a polyether polyol of the present invention by copolymerization of an α-olefin oxide and ethylene oxide with trimethyloylpropane.

Into a one-gallon autoclave, 134 grams of trimethylolpropane, 430 grams of a mixture of $C_{11}$ to $C_{14}$ α-olefin oxides, and 4 grams of sodium hydroxide were charged. A reduced pressure of 10 mm. of mercury was then applied while heating the mixture to 80° C. The mixture was maintained at 80° C. for ten minutes, then the autoclave was pressurized under nitrogen to 34 p.s.i.g. The temperature was then increased to about 130° C. and the addition of ethylene oxide was started. 805 grams of ethylene oxide was added over a period of two hours and 35 minutes at 130° C. The mixture was held for another one hour and thirty minutes at this temperature. The mixture was then cooled to 50° C. and discharged.

The resulting polyether polyol was found to have an OH number of 131, a cloud point of 75° C. at a concentration of 1% by weight polyol in water, and a surface tension of 28.7 dynes per centimeter at a concentration of 0.1% by weight polyol in water. Foaming tests illustrated that the polyol foamed to 600 millimeters in five minutes and decayed to 430 millimeters in five minutes.

EXAMPLE X

The procedure of Example IX was duplicated with the exception that 420 grams of 1,2-epoxydodecane (dodecylene oxide) was substituted for the mixture of oxides employed in Example IX. The resulting polyol has a hydroxyl number of 135 and a cloud point of 75° C. at a concentration of 1% by weight polyol in water. Foaming tests indicate that the polyol foamed to 600 millimeters in five minutes and decayed to 420 millimeters in five minutes.

EXAMPLE XI

Comparative Example (A) Polyol prepared in accordance with the subject invention: Into a cleaned, dried autoclave, 248 parts of ethylene glycol and four parts of potassium hydroxide were charged. A reduced pressure of less than 10 mm. of mercury was then applied to the autoclave while heating the charge to 80° C. The temperature was maintained at 80° C. for ten minutes after which the autoclave was pressurized under nitrogen to 15 p.s.i.g. The temperature of the charge was then increased to 135° C. at which time a mixture of 1416 parts of ethylene oxide and 860 parts of a mixture of $C_{11}$ to $C_{14}$ oxides (average molecular weight of 215) was added to the charge maintained at a pressure of 75–90 p.s.i.g. over a period of ten hours. After the addition was completed, the reaction mixture was maintained at 135° C. for an additional hour. The reaction mixture was then cooled to 50° C. and discharged. The reaction mixture was filtered with Celite and stirpped of volatiles for one hour at 125° C. under less than one mm. of mercury.

The resulting homogeneous polyol was found to have a hydroxyl number of 193.5 and a cloud point (1%) of 53° C. Dynamic Foam Height evaluation (120° F., 400 ml./min.) illustrated that the polyol foamed to 600 millimeters in 2.36 minutes and decayed to 590 millimeters in five minutes, indicating a very stable foam.

(B) Polyol of U.S. Pat. No. 3,240,819: Into an autoclave, 832 parts of polyethylene glycol having an average molecular weight of 400 and four parts of potassium hydroxide were charged. The vessel was pressurized and heated as described above. To the reaction vessel was added 430 parts of a mixture of $C_{11}$ to $C_{14}$ oxides (average molecular weight of 215). The temperature of the charge was maintained at 135° C. After a four-hour period, the reaction mixture was cooled to 50° C. and discharged. The reaction mixture was filtered with Celite and stripped of volatiles for one hour at 125° C. under less than one mm. of mercury.

The resulting polyol was found to separate on standing, i.e., non-homogeneous, to have a hydroxyl number of 195 and a cloud point (1%) of 59° C. Dynamic Foam Height evaluation (120° F., 400 ml./min.) illustrated that the polyol foamed to 90 millimeters in ten minutes and decayed to 15 millimeters in five minutes.

This example illustrates that a polyol of the subject invention clearly exhibited better foaming properties than a polyol of the closest prior art.

What is claimed is:

1. A heteric polyether polyol having a molecular weight of from 400 to 6,000 prepared by copolymerizing in the presence of an alkaline oxyalkylation catalyst at a temperature between 50° C. and 150° C. for a period of from one hour to ten hours under an inert gas pressure, a mixture of (a) a low molecular weight alkylene oxide selected from the group consisting of ethylene oxide and a mixture of ethylene oxide and a low molecular weight alkylene oxide containing from three to four carbon atoms, said mixture comprising at least fifty weight percent of ethylene oxide,
   (b) an α-olefin oxide containing from ten to twenty carbon atoms or a mixture of said oxides, and
   (c) a polyhydric alcohol having from two to ten carbon atoms and from two to six hydroxyl groups selected from the group consisting of alkane polyols, alkene polyols, alkyne polyols and oxyalkylene polyols, in a mole ratio of (b) to (c) of from about 1:1 to 3:1, the amount of (a) employed being such to provide a polyol containing from 40% to 80% by weight ethylene oxide.

2. The polyol of claim 1 wherein (c) is an alkane polyol.

3. The polyol of claim 2 wherein (c) is glycerol.
4. The polyol of claim 1 wherein (a) is ethylene oxide.
5. The polyol of claim 1 wherein (a) is ethylene oxide, (b) is a mixture of α-olefin oxides, and (c) is an alkane polyol.
6. The polyol of claim 5 wherein (c) is glycerol.

References Cited

UNITED STATES PATENTS

| | | | |
|---|---|---|---|
| 3,240,819 | 3/1966 | Gaertner et al. | 260—615 B |
| 3,637,869 | 1/1972 | Seizinger | 260—615 B |
| 3,031,510 | 4/1962 | Crecelius | 260—615 B |
| 3,607,778 | 9/1971 | Lincoln | 252—353 |

FOREIGN PATENTS

| | | | |
|---|---|---|---|
| 558,786 | 6/1958 | Canada | 260—615 B |

HOWARD T. MARS, Primary Examiner

U.S. Cl. X.R.

252—89, 106, 307, 321; 260—Dig. 1, 77.5 AP, 484 B, 484 R, 611 A, 953; 424—341